(12) United States Patent
Takahashi

(10) Patent No.: US 6,575,145 B2
(45) Date of Patent: Jun. 10, 2003

(54) FUEL SUPPLY SYSTEM FOR FOUR-CYCLE OUTBOARD MOTOR

(75) Inventor: Masanori Takahashi, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/994,435

(22) Filed: Nov. 26, 2001

(65) Prior Publication Data

US 2002/0062819 A1 May 30, 2002

(30) Foreign Application Priority Data

Nov. 27, 2000 (JP) .................................. 2000-359493

(51) Int. Cl.[7] ............................................... F02M 37/04
(52) U.S. Cl. ........................................ 123/519; 123/516
(58) Field of Search ................................ 123/516, 518, 123/519, 41.31

(56) References Cited

U.S. PATENT DOCUMENTS

| | | | |
|---|---|---|---|
| 5,243,945 A | | 9/1993 | Katoh et al. |
| 5,249,557 A | | 10/1993 | Katoh et al. |
| 5,271,358 A | | 12/1993 | Katoh et al. |
| 5,309,885 A | * | 5/1994 | Rawlings et al. ............ 123/509 |
| 5,647,331 A | * | 7/1997 | Swanson ..................... 123/516 |
| 5,653,103 A | * | 8/1997 | Katoh ......................... 60/283 |
| 5,687,686 A | | 11/1997 | Takahashi |
| 5,724,936 A | * | 3/1998 | Osakabe ................. 123/195 A |
| 5,752,866 A | | 5/1998 | Takahashi et al. |
| 5,755,606 A | | 5/1998 | Takahashi et al. |
| 5,778,847 A | | 7/1998 | Takahashi et al. |
| 5,797,378 A | * | 8/1998 | Kato .......................... 123/516 |
| 5,829,402 A | | 11/1998 | Takahashi et al. |
| 5,830,021 A | | 11/1998 | Takahashi et al. |
| 5,855,193 A | | 1/1999 | Takahashi |
| 5,878,726 A | | 3/1999 | Takahashi et al. |
| 5,894,831 A | | 4/1999 | Takahashi et al. |
| 5,899,197 A | | 5/1999 | Watanabe et al. |
| 5,899,778 A | | 5/1999 | Hiraoka et al. |
| 5,915,363 A | | 6/1999 | Iwata et al. |
| 5,941,205 A | | 8/1999 | Hiraoka et al. |
| 5,957,112 A | | 9/1999 | Takahashi et al. |
| 6,030,262 A | | 2/2000 | Okamoto et al. |
| 6,062,927 A | | 5/2000 | Hiraoka et al. |
| 6,062,928 A | | 5/2000 | Watanabe et al. |
| 6,082,336 A | | 7/2000 | Takahashi et al. |
| 6,082,343 A | | 7/2000 | Oishi et al. |
| 6,099,374 A | | 8/2000 | Watanabe et al. |
| 6,109,231 A | | 8/2000 | Watanabe et al. |
| 6,142,842 A | | 11/2000 | Watanabe et al. |
| 6,152,119 A | | 11/2000 | Hoshiba et al. |
| 6,186,108 B1 | | 2/2001 | Takahashi et al. |
| 6,213,096 B1 | | 4/2001 | Kato et al. |
| 6,213,829 B1 | | 4/2001 | Takahashi et al. |
| 6,220,217 B1 | | 4/2001 | Kato |
| 6,227,184 B1 | | 5/2001 | Katayama et al. |
| 6,276,327 B1 | | 8/2001 | Fukuoka et al. |
| 6,286,472 B1 | | 9/2001 | Takahashi et al. |
| 6,286,476 B1 | | 9/2001 | Hiraoka et al. |
| 6,296,536 B1 | | 10/2001 | Katayama et al. |
| 6,298,815 B1 | | 10/2001 | Kashima et al. |
| 6,321,711 B1 | | 11/2001 | Kato |
| 6,325,037 B1 | | 12/2001 | Takahashi et al. |
| 6,346,018 B1 | | 2/2002 | Watanabe |
| 6,422,255 B1 | * | 7/2002 | Hartke et al. ............... 123/516 |

\* cited by examiner

*Primary Examiner*—Thomas N. Moulis
(74) *Attorney, Agent, or Firm*—Knobbe, Martens, Olson, & Bear, LLP.

(57) ABSTRACT

An arrangement for a four-cycle, direct injected engine for an outboard motor is disclosed. The engine includes a fuel injection system that includes a fuel pump, a plurality of fuel injectors, a fuel pump and a vapor separator. The vapor separator is communication with the fuel pump and at least one fuel return line. The vapor separator includes a vent for removing vapors from the fuel. The vapor separator also includes a canister positioned within the vapor separator below the vent. The canister including hydrocarbon absorption media.

29 Claims, 6 Drawing Sheets

FUEL SUPPLY SYSTEM FOR FOUR-CYCLE OUTBOARD MOTOR

PRIORITY INFORMATION

The present application is based on and claims priority to Japanese Patent Application No. 2000-359493, filed Nov. 27, 2000, which is hereby expressly incorporated by reference.

BACKGROUND OF THE INVENTION

1. Field of the Invention

This invention relates to an outboard motor, and more particularly to an improved fuel supply system for an outboard motor.

2. Description of the Related Art

A typical outboard motor comprises a power head and a housing depending from the power head. The power head includes an internal combustion engine that drives a marine propulsion device (e.g., a propeller) through a driveshaft and a propulsion shaft, which are both journaled within the housing. The marine propulsion device is attached to the end of a propulsion unit, which extends from housing and is in a submerged position. The internal combustion engine is typically covered by a protective cowling. The protective cowling typically comprises an upper portion and lower portion, which are removably mounted to each other by hooks or other coupling mechanisms, such as, for example, hooks.

There is an increasing emphasis on obtaining more effective emission control, better fuel economy and, at the same time, continued high or higher power output in outboard motors. Accordingly, four-cycle engines have started to replace two-cycle engines in outboard motors. In a similar manner, it has been suggested that direct fuel injection be used in outboard motors to further reduce emissions and improve performance.

A typical fuel injection system includes a fuel tank, a low-pressure fuel pump, a high pressure fuel pump, a plurality of fuel injectors and an injection control device. The low pressure fuel pump delivers fuel from the fuel tank to the fuel vapor separator through a first delivery passage. The high pressure fuel pump, in turn, transfers the fuel from the vapor separator to the fuel injectors. The fuel injectors are arranged to spray fuel directly into the combustion chamber of the engine, under the control of the injection control device. Excess fuel is returned to the vapor separator through a return passage.

It is well known that fuel vapors can collect in the fuel injection system. Their concentration in the fuel-supply system can vary with operating and environmental conditions. This can cause the fuel injectors to unpredictably run lean or rich, resulting in poor engine performance. The vapor separator removes the fuel vapors from the liquid fuel such that the fuel vapors are not mixed with the liquid fuel and injected into the combustion chamber. A vent is provided on the vapor separator to remove the fuel vapors from the separator. Venting the fuel vapors directly to the atmosphere is generally not an acceptable solution because of environmental concerns; as such, the fuel vapors typically are mixed in with an incoming air charge. This does not completely eliminate the unpredictability associated with fuel vapors because the fuel vapors in the intake charge can still affect the fuel/air ratio.

Four cycle engines tend to produce higher exhaust temperatures as compared to two-cycle engines. As such, the temperature within the cowling of a four-cycle outboard motor tends to be higher as compared to a two-cycle outboard motor. This increase in temperature can result in an increased amount of fuel vapors in the fuel system. A need therefor exists for reducing the amount of fuel vapors in a four-cycle outboard motor.

SUMMARY OF THE INVENTION

Accordingly, one aspect of the present invention is a four-cycle engine for powering an outboard motor. The engine comprises a plurality of combustion chambers arranged generally vertically above one another. The combustion chambers are formed by at least an engine body, a cylinder head assembly and a piston that moves relative to the engine body and the cylinder head assembly. A crankshaft extends in a generally vertical direction and is coupled to the piston such that movement of the piston causes the crankshaft to rotate. At least one air intake port and at least one exhaust port communicate with the combustion chamber. An intake valve is moveable between an open and closed position and an exhaust valve is moveable between an open and closed position. A valve actuating mechanism actuates the exhaust and intake valves. A head cover assembly covers the valve actuating mechanism. A fuel injection system comprises at least one fuel injector, a fuel pump that communicates with at least one of the fuel injectors, a vapor separator that communicates with the fuel pump through at least a first supply line, and at least one return line that is arranged to return fuel to the vapor separator from a point downstream of the fuel pump. The vapor separator includes a vent and a fuel absorption canister that includes a fuel absorption media. The canister being located in the vapor separator below the vent.

Another aspect of the present invention is a four-cycle engine for powering an outboard motor. The engine comprises a plurality of combustion chambers arranged generally vertically above one another. The combustion chambers are formed by at least an engine body, a cylinder head assembly and a piston that moves relative to the engine body and the cylinder head assembly. A crankshaft extends in a generally vertical direction and is coupled to the piston such that movement of the piston causes the crankshaft to rotate. At least one air intake port and at least one exhaust port communicate with the combustion chamber. An intake valve is moveable between an open and closed position and an exhaust valve is moveable between an open and closed position. A valve actuating mechanism actuates the exhaust and intake valves. A head cover assembly covers the valve actuating mechanism. A fuel injection system comprises at least one fuel injector, a fuel pump that communicates with at least one of the fuel injectors, a vapor separator that communicates with the fuel pump through at least a first supply line, and at least one return line that is arranged to return fuel to the vapor separator from a point downstream of the fuel pump. The vapor separator including a vent and means for reducing an amount of hydrocarbons entering the vent.

Yet another aspect of the present invention is a vapor separator for an internal combustion engine. The vapor separator comprises a housing, which defines a cavity, a first inlet conduit that is connected to a first fuel supply line, a first outlet conduit that is connected to a second fuel supply line, and a second inlet conduit that is connected to a fuel return line, and a vent. The vapor separator is arranged such that liquid fuel is collected in a lower portion of the vapor separator and vapors are collected in an upper portion of the vapor separator. The first and the second inlet conduits have outlets located in the lower portion. The first outlet conduit has an inlet also located in the lower portion. The vent has an inlet located in the upper portion. The vapor separator further includes a fuel absorption canister that includes a fuel absorption media. The canister is located in the vapor separator below the inlet of the vent and above the outlets of the first and second inlet conduits and the inlet of the first outlet conduit.

Still yet another aspect of the present invention is a vapor separator for an internal combustion engine. The vapor separator comprises a housing, which defines a cavity, a first inlet conduit that is connected to a first fuel supply line, a first outlet conduit that is connected to a second fuel supply line, and a second inlet conduit that is connected to a fuel return line, and a vent. The vapor separator is arranged such that liquid fuel is collected in a lower portion of the vapor separator and vapors are collected in an upper portion of the vapor separator. The first and the second inlet conduits have outlets located in the lower portion. The first outlet conduit has an inlet also located in the lower portion. The vent has an inlet located in the upper portion. The vapor separator further includes means for reducing an amount of hydrocarbons from entering the inlet of the vent.

DETAILED DESCRIPTION OF THE PREFERRED EMBODIMENT

Figure 1:
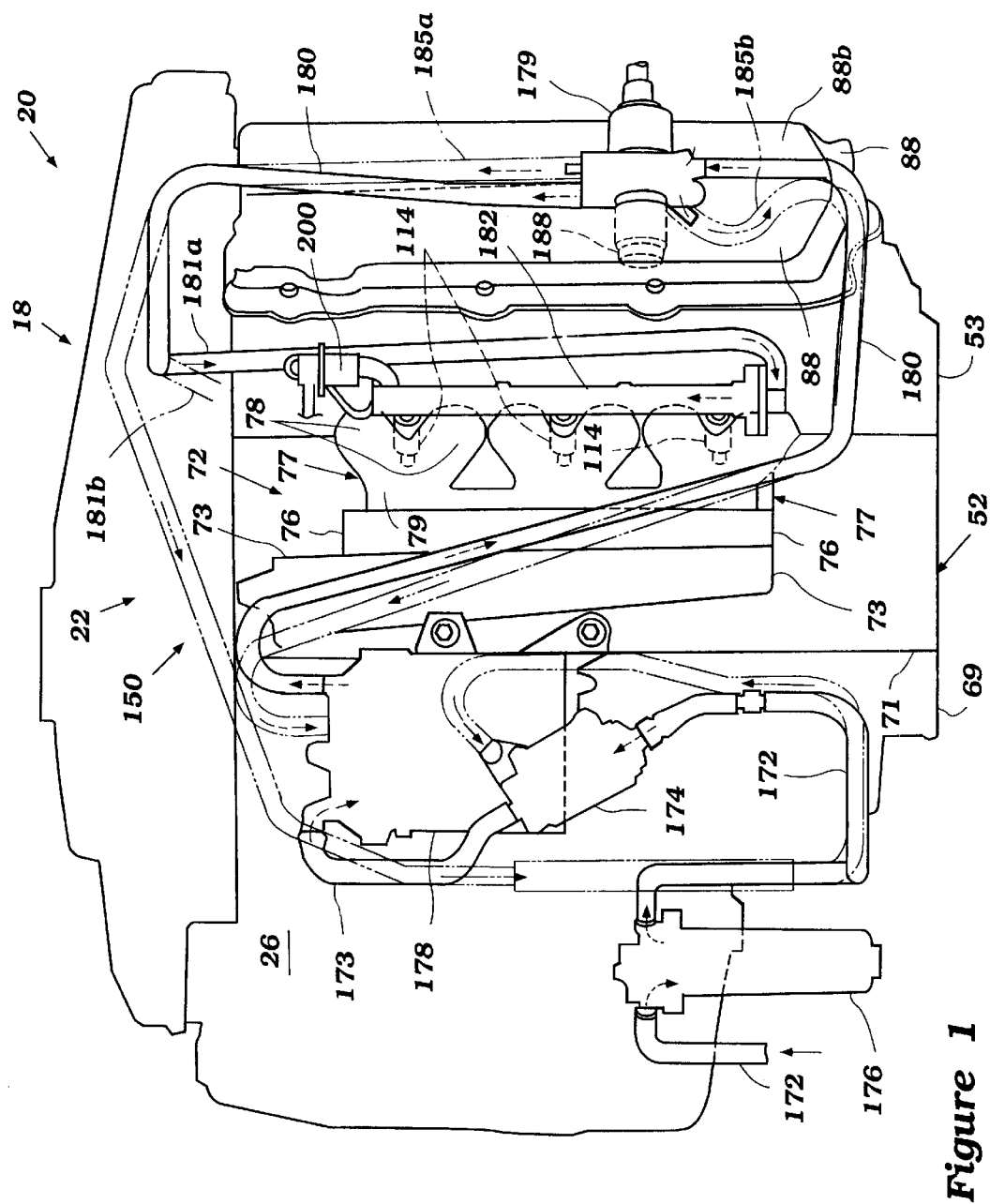
FIG. 1 is a side elevational view of a power head of an outboard motor having an engine with certain features and advantages according to the present invention.

FIG. 1 is a side elevational view of a power head 18 of an outboard motor 20 powered by an engine 22 having certain features and advantages according to the present invention. Although the engine 22 is shown in the context of an outboard motor, various aspect and features of the present invention can also be applied to engines in other compact environments such as, for example, marine drive units (e.g., a stern drive unit) and land vehicles.

The illustrated outboard motor 20 is of the type utilized to propel a watercraft (not shown). The power head 18 preferably includes a protective cowling assembly 21 (partially shown in FIG. 1), which surrounds the engine 22 and defines an engine compartment 26. As is typical in the art, a lower unit extends downwardly from the cowling assembly 21. The lower unit comprises an upper or "driveshaft housing" section (not shown) and a lower section (not shown).

Figure 2:
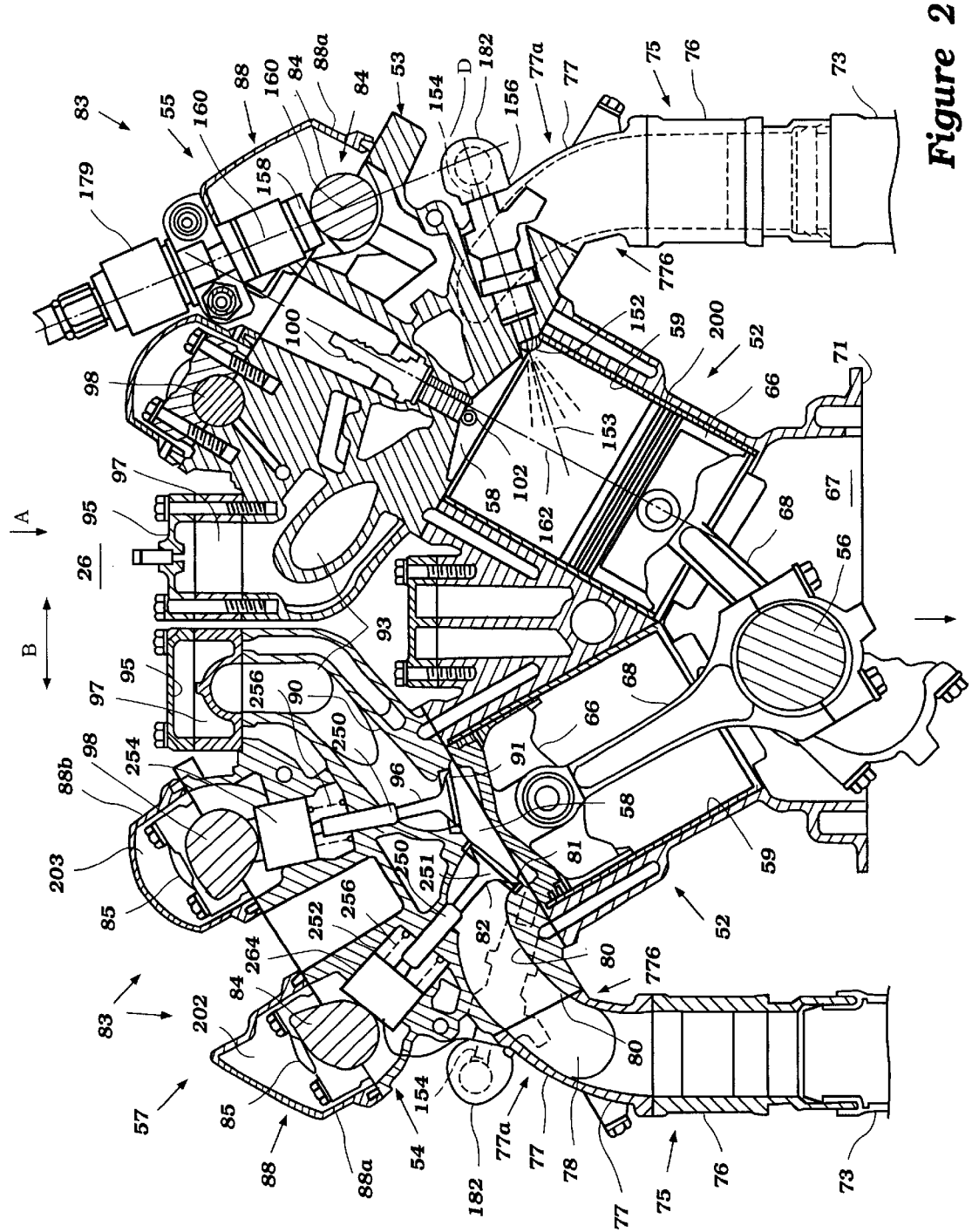
FIG. 2 is a cross-sectional view of the engine of FIG. 1.

With reference to FIGS. 1 and 2, the illustrated engine 22 operates on a four-stroke cycle combustion principle. The engine 22 comprises a cylinder block 52 with a left cylinder head assembly 53 and a right cylinder head assembly 54 that are coupled to the cylinder block 52 to form left and right cylinder banks 55, 57. It should be noted that "left" and "right" as designated as viewed facing the rear of the engine in the direction the arrow labeled A in FIG. 2. The cylinder banks 55, 57 define a valley that faces away from the watercraft to which the motor 20 is attached. In the illustrated arrangement, each bank defines three cylinders 59, each having a combustion chamber 58 defined in the space between the cylinder 59, its corresponding cylinder head assemblies 53, 54, and a piston 66 movably positioned in the cylinder 59.

The three cylinders of the left and right cylinder banks 55, 57 are preferably offset from each other. That is, with the crankshaft 56, the first, second and third cylinders 59 of the right cylinder bank 57 are preferably positioned higher than the respective first, second, and third cylinders 59 of the left cylinder bank 55. As such, the right cylinder bank 57 is the "higher" cylinder bank.

As may be appreciated by those skilled in the art, the engine 22 may have a greater or lesser number of cylinders, such as two, four, or eight or more and be arranged in other than "V" fashion, such as in an in-line arrangement. In addition, while the cylinder block is shown as unitary component, it is understood that it can be formed by a plurality of elements and thus constitute an assembly (i.e., a cylinder block assembly).

As illustrated in FIG. 2, each piston 66 is connected to a connecting rod 68 that is coupled to a vertically extending crankshaft 56. The crankshaft 56 is connected to a top end of a driveshaft, (not shown), which extends downwardly through the lower unit, where it can drive, for example, a bevel gear and a conventional forward-neutral-reverse transmission. A control (not shown) is preferably provided for allowing an operator to remotely control the transmission from the watercraft.

The transmission drives a propeller shaft, which is journaled within the lower section of the lower unit in a known manner. A hub of a propeller is coupled to the propeller shaft for providing a propulsive force to the watercraft in a manner well known in this art.

With continued reference to FIGS. 1 and 2, the crankshaft 56 is journaled for rotation with respect to the cylinder block 52. A crankcase cover 69 engages an end 71 of the block 52 generally opposite the heads 53, 54. The crankcase cover 69 and the cylinder block 52 define a crankcase chamber 67 within which the crankshaft 56 rotates. The crankcase cover 69 may be attached to the cylinder block 52 by bolts or similar means for attaching known to those skilled in the art. The crankcase chamber 67 is positioned generally opposite the heads 53, 54 and on the side of the engine closest to the watercraft 24. Although not illustrated, a flywheel is preferably maintained in position on the top end of the crankshaft 56.

The engine 22 includes an induction intake system 72 for providing air charge to each combustion chamber 58. The illustrated intake system 72 is generally positioned at the crankcase or watercraft end of the engine 22 on both sides of the engine 22. Air passes through a vent (not shown) in the protective cowling into a pair of inlets (not shown), which lead to a pair of silencers 73 which are positioned on both sides of the engine 22.

As best illustrated in FIG. 2, an intake pipe 75 extends from the silencer 73 along the side of the engine 22. A throttle body 76 is provided in the intake pipe 75 for controlling the flow of air into the combustion chambers 58. The throttle body 76 preferably comprises a moveable plate (see the embodiment illustrated in FIG. 6, which will be describe in detail below) that extends controlled through a cable by the operator of the watercraft.

As best illustrated in FIG. 1, a manifold 77 includes has a main part 79 that is connected to the throttle body 76. Two individual branches 78 preferably extend from the main part 79 to an intake passage 80 (see FIG. 2) in the cylinder head assemblies 53, 54 leading to one of the combustion chambers 58. As such, in the illustrated arrangement, each combustion chamber 58 is associated with two intake passages 80 and each intake passage 80 is associated with an intake valve opening 81 (see also FIG. 3), which is exposed to the combustion chamber 58. With particular reference to FIG. 2, the manifold 77 preferably bends towards the cylinder had 53, 54 defining and outer bend portion 77*a* and an inner bend portion 77*b*. The outer bend portion 77*a* generally faces away from the engine 22 toward the cowling while the inner bend portion generally faces toward the engine 22 and the cylinder body 52.

With continued reference to FIG. 2, there is at least one intake valve 82 associated with each intake passage 80. In the illustrated arrangement, all of the intake valves 82 for each bank of cylinders are preferably actuated by a single intake camshaft 84. The intake camshaft 84 is mounted for rotation with respect to its respective cylinder head assemblies 53, 54 and is connected thereto with at least one bracket 85. Each intake camshaft 84 rotates within an enclosure defined by the cylinder head assembly 53, 54 and a cover assembly 83, which in the illustrated arrangement comprises an intake camshaft cover 88*a* connected to the cylinder head assembly.

Each valve 82 preferably has a head 251 which is adapted for seating against the intake valve opening 81, and a stem 250 extending from the head through a valve guide 252 to a follower 254. A spring 256 is positioned between the follower 254 and a portion of the cylinder head assembly 53, 54 for biasing the valve 82 upwardly into a position in which the valve 82 closes the passage 80.

An exhaust system is provided for routing the products of combustion within the combustion chambers 58 to a point external to the engine 22. In the illustrated arrangement, two exhaust ports 91 (see FIG. 3) are associated with each combustion chamber 58. Exhaust passages 90 lead from each exhaust port 91 to an exhaust manifold 93, which is defined in part by a jacket 95 that is attached to the cylinder head assembly 53, 54. The jacket 95 preferably includes cooling passages 97 for cooling the exhaust gases.

As shown in FIG. 2, at least one exhaust valve 96 is associated with each exhaust port 91. Like the intake valves 82, the exhaust valves 96 of each cylinder bank are preferably all actuated by a single exhaust camshaft 98. Each exhaust camshaft 98 is journaled for rotation with respect to its respective cylinder head assembly 53, 54 and connected thereto with at least one bracket 85. Each exhaust camshaft 98 is enclosed within the cover assembly, which in the illustrated arrangement includes an exhaust camshaft cover 88*b*, which defines an exhaust camshaft chamber 203.

As with the intake valve 82, each exhaust valve 96 preferably includes a head 251 for selective positioning against a valve seat in the passage 90. A stem 250 extends from the head of the valve 96 through a valve guide 252 in the cylinder head assembly 53, 54. A follower 254 is positioned at the opposite end of the stem 250 for engagement by the camshaft 98. A spring 256 is positioned between the follower and the cylinder head assembly 53, 54 for biasing the valve 96 into a position in which the valve closes the passage 90.

Although not illustrated, means are provided for driving the camshafts 84,98. This means for driving may be of a variety of types known to those skilled in the art, such as a toothed gear mounted on the crankshaft, a similar gear mounted to each camshaft, and a timing chain extending in engagement with the gears whereby the crankshaft drives the camshafts.

The remainder of the exhaust system includes an exhaust guide (not shown), which is in communication with the exhaust manifold 93 and is positioned at the bottom end of the engine 22. The exhaust guide has a passage extending therethrough which communicates with the common exhaust passage. The common exhaust passage extends through the valley of the engine and is defined by the cylinder block 52. An exhaust pipe is connected to the bottom side of the exhaust guide in alignment with the passage therethrough. The exhaust pipe terminates within a chamber of a muffler. The muffler is preferably positioned within the lower unit near the driveshaft. An exhaust gas outlet is provided in the bottom end of the muffler, through which the exhaust gas is routed through the hub of the propeller to a point external of the motor 20.

A suitable ignition system is provided for igniting an air and fuel mixture within each combustion chamber 58. Such systems are well known to those skilled in the art. The illustrated ignition system may includes a spark plug 100, which is positioned in the cylinder head assembly 53, 54 and includes an electrode 102 exposed to the combustion chamber 58. The sparkplug 100 is used to ignite the air and fuel mixture within each combustion chamber 58.

The engine 22 preferably also includes a suitable cooling system. In such a system, the cooling liquid is preferably water drawn from the body of water in which the motor 22 is positioned. The water is pumped through a water inlet by a water pump positioned in the lower unit. The pump is preferably driven by the driveshaft and expels the cooling liquid upwardly through a cooling liquid supply pipe. The coolant flows through the supply pipe from the pump to one or more coolant passages (e.g., the passages 97 in the jacket 95) for cooling the cylinder head assembly 53, 54, block 52, and exhaust system.

The cooling system may include a pressure valve (not shown) positioned along the coolant path for diverting coolant through a relief passage and thereon to the coolant drain system in the event the coolant pressure exceeds a predetermined high pressure. In addition, the cooling system may include a thermostat positioned along the coolant path for monitoring the temperature of the coolant. The thermostat is preferably and arranged so that if the coolant temperature is high, the thermostat is opened to allow coolant to flow though the engine 22 at a high rate. On the other hand, if the temperature of the coolant is low, then the thermostat is closed, allowing the engine to warm up. The coolant is preferably returned through a discharge into the body of water.

The engine 22 includes a lubricating system for providing lubricant to the various portions of the engine. For example, the lubricating system can include an oil reservoir positioned below the engine 22. The reservoir is in communication with an oil pump via a suction tube. The oil pump is drivingly positioned on the end of the crankshaft 56 at the bottom of the engine 22. Seals are provided for sealing the oil pump with respect to the remainder of the engine 22. The oil pump draws lubricant from the reservoir and then delivers it through a connecting passage through galleries leading throughout the engine. The lubricant is then arranged to drain back to the reservoir for reuse. A portion of the cooling system may be arranged to cool the lubricant in the reservoir.

A fuel supply system is provided for delivering fuel to each combustion chamber 58. With reference to FIGS. 1–4, fuel is pumped from a fuel source, such as a tank on board the watercraft 24, through a supply line 172 by a low pressure pump 174. This pump 174 may be of the diaphragm type and includes an inlet 167, which is connected to the supply line 172. Preferably, the pumped fuel is passed through a filter 176 positioned along the line 172.

The fuel is delivered by the pump 174 through a first fuel line 173 to an inlet 165 of a vapor separator 178. The vapor separator 178 is adapted to separate liquid fuel from vapor as will be explained in more detail below. A fuel supply pipe 180 connects the vapor separator 178 to a high pressure pump 179. A fuel return line 175 (see FIG. 6) preferably extends between the first fuel line 173 and the supply line 172. In this manner, if the vapor separator 178 is fuel, fuel can be returned to the intake 167 of the fuel pump 174.

The high pressure pump 179, which will be described in more detail below, delivers fuel under high pressure to a high pressure hose 180, which preferably extends generally upwardly from the high pressure pump 180 to a location above the cylinder head assembly 53, 54. Two branch hoses 181a,b branch off from the high pressure hose 180 and extend downwardly to the lowest cylinders where they are connected to a pair of substantially vertical fuel conduits or rails 182. Each fuel rail 182 extends adjacent to one of the cylinder banks 55, 57 and supplies fuel under pressure to the fuel injectors 114. An inlet 154 to the fuel injectors 114 is connected to the fuel rails 182 through a fuel rail port 156 (see FIG. 3).

Figure 3:
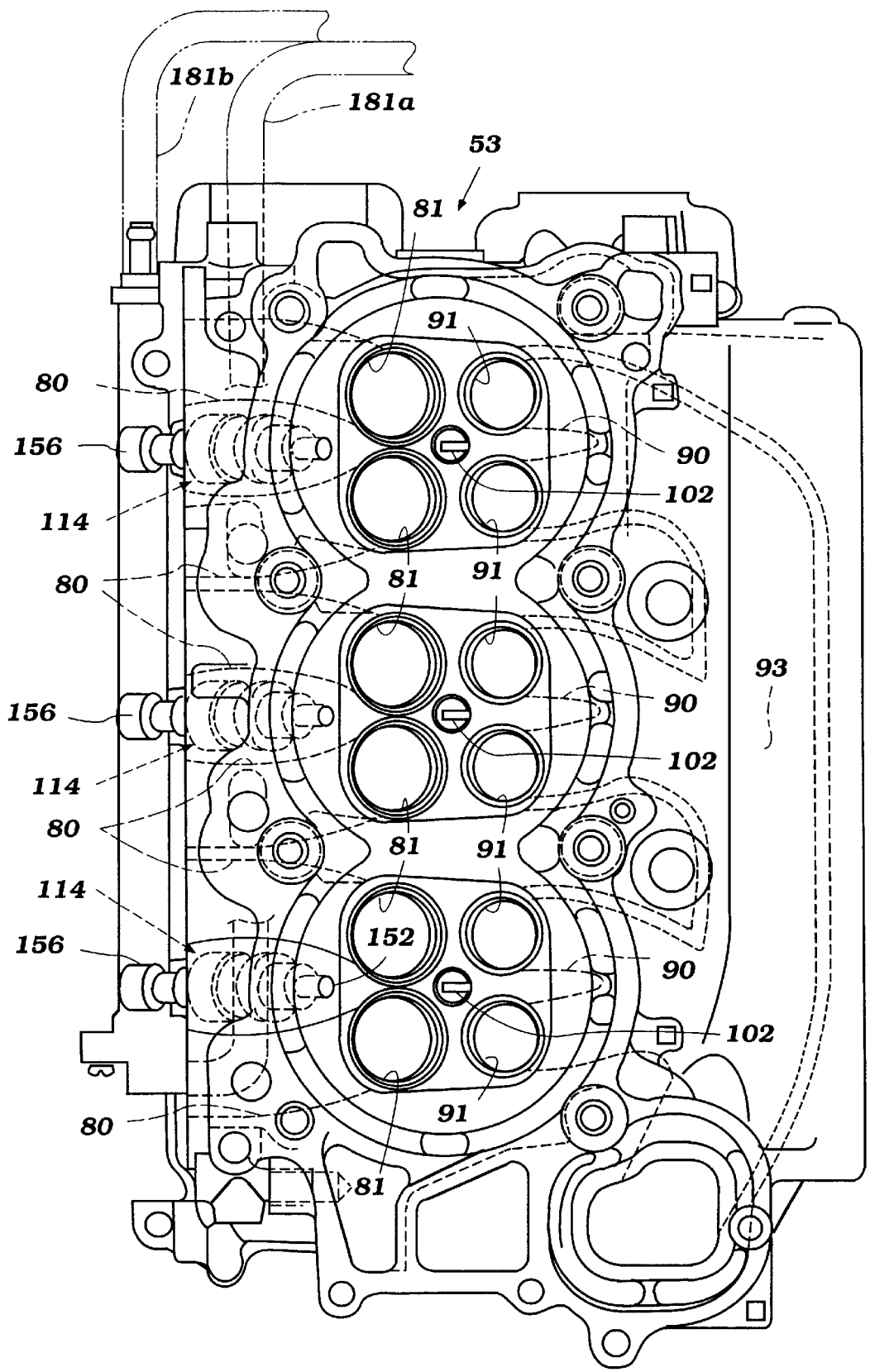
FIG. 3 is a side elevational view a portion of a cylinder head assembly of the engine of FIG. 1.
Figure 4:
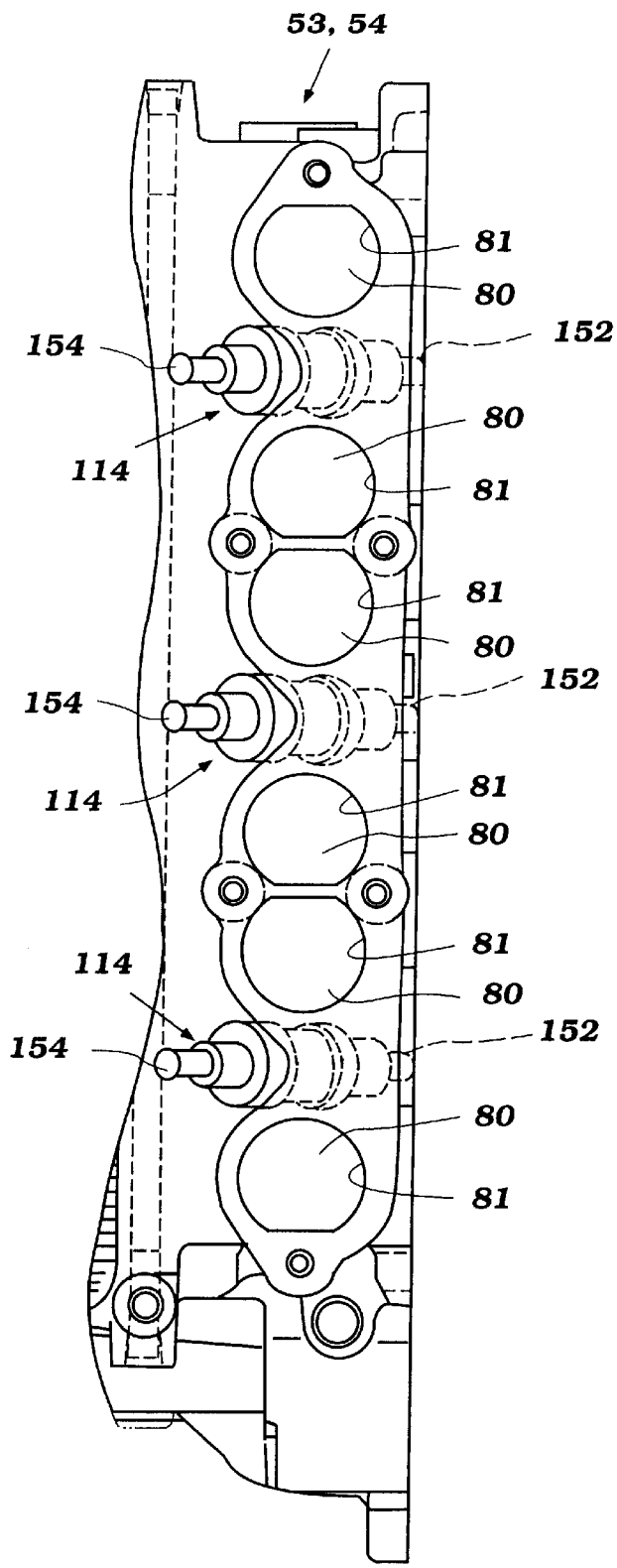
FIG. 4 is a side view of the cylinder head assembly of the engine of FIG. 1.

As shown in FIGS. 2–4, the fuel injectors 114 are preferably arranged to inject fuel directly into the combustion chambers 58. This direct injection arrangement requires that the fuel be supplied to the injectors at a relatively high pressure such as, for example, a pressure within the range of 50 to 150 kg/cm$^2$.

The fuel injectors 114 are preferably located between adjacent branch portions 78 of the manifold 77. More specifically, the fuel injectors 114 are arranged so that injection nozzles 152 of the fuel injector 114 are located between the two intake ports 81 associated with each combustion chamber 58. As best seen in FIG. 2, the injection nozzles 152 are preferably arranged such that a spray axis 153 is directed towards the center longitudinal axis 162 of the cylinder 59. Moreover, the fuel rails 182 are preferably located adjacent the outer bend portion 77a of the manifold 77, within a recess "D" defined by the outer bend portion 77a and the cylinder head assembly 53. This arrangement is preferred because it is compact.

Figure 5:
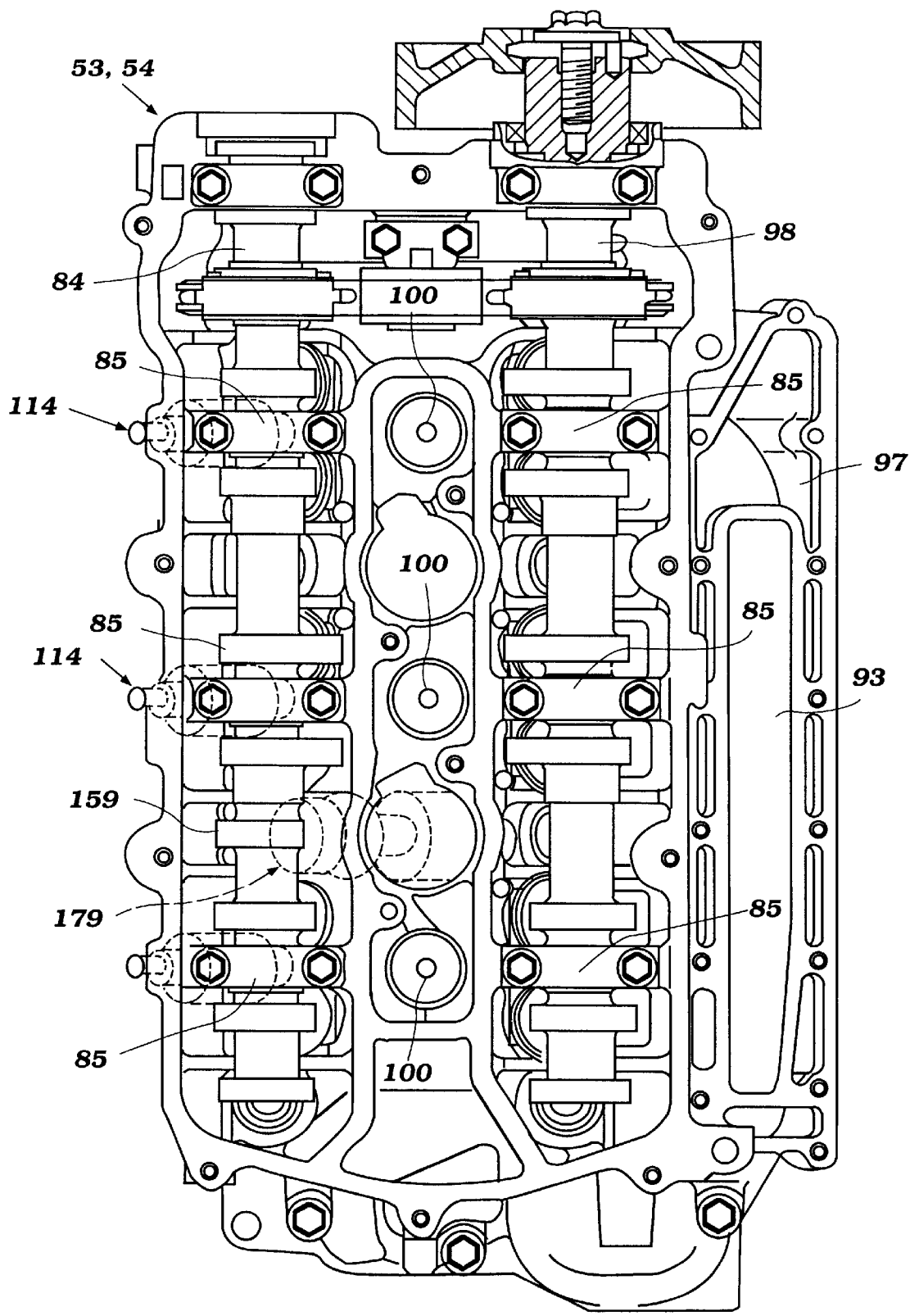
FIG. 5 is a side view of the intake and exhaust camshafts of the engine of FIG. 1.

The high pressure pump 179 is preferably driven by the intake camshaft 84 of the left cylinder bank 55. For example, in the illustrated arrangement, the high pressure pump 179 includes a plunger 158, which is actuated by a pump cam 159 on intake camshaft 84 (see FIG. 5). The plunger 158 preferably moves along a longitudinal axis 160 of the fuel injector. Rotation of the camshaft 84 causes reciprocal motion of the plunger 158 along the longitudinal axis 160, which powers the high pressure pump in a known manner. To conserve space, the high pressure pump 179 and the plunger 158 are positioned at least partially within the intake camshaft cover 88a. Moreover, the high pressure pump 179 and the plunger are arranged to incline toward the center of the engine 22. That is, the longitudinal axis 160, which is slanted towards a cylinder axis 162 of the left cylinder bank 55. That is, the high pressure pump 179 is arranged such that its longitudinal axis 160 lies transverse to the cylinder axis 162. More preferably, the longitudinal axis 160 forms an acute angle with the cylinder axis 162. Most preferably, the longitudinal axis 160 forms an angle of approximately 45 degrees with the cylinder axis 162. In this arrangement, the high-pressure pump 179 does not project directly towards the cross-direction as identified by arrow B (see FIG. 2) of the engine nor does it project directly towards the rear of the engine 22. As such, this arrangement reduces the size of the engine and increases the available space within the cowling for other components. It should also be noted that the high pressure pump 179 is preferably located generally in-between adjacent cylinders 59.

As mentioned above, the high pressure pump 170 is preferably driven by the intake camshaft 84 of the left cylinder bank 55, which is the lower cylinder bank. Moreover, with reference to FIG. 1, the high pressure pump 179 is preferably positioned the adjacent one of the lower cylinders 66. For example, in the illustrated arrangement, the high pressure pump 179 is located generally between the second and third cylinders 66 of the left cylinder bank 55. As will be explained below, this arrangement generally preferred because it also reduces the size of the engine 22.

The high pressure fuel pump 179 is continuously driven by the engine 22, thus maintaining a high fuel pressure in the fuel rails 182. The fuel supply system 150 preferably includes a pressure regulator 200, which in the illustrated arrangement is connected to an upper end of the fuel rail (see FIG. 1). When the pressure within the pump 179 exceeds a desired limit, the regulator 200 opens an access and some of the contents of the fuel pump 179 are dumped through a first return line 185a the vapor separator 178. As shown in FIG. 2, the illustrated first return line 185a extends upwardly from the high pressure pump 179 to and extends forward above the engine 22 where it is connected to the regulator 200. The first return line 185a then extends downwardly past the vapor separator 178 and the bottom of the engine. The first return line 185a ultimately extends upwardly where it connects to the vapor separator 178. Preferably, at least a portion of the first return line 185a is surrounded by a cooler 280. The cooler 280 has an inlet 282, which is connected to the cooling system, and an outlet 280, which is connected to a drain. The cooler 280 lowers the temperature of the fuel in the return line 185a so as to reduce the concentration of fuel vapors. A second return line 185b preferably extends from the high pressure fuel pump 179 and the vapor separator 178 along the left side of the engine 22.

The illustrated engine 22 preferably also includes a blow-by gas ventilation system for collecting the blow-by gases and returning them to the induction system as is well known in the art. The ventilation system generally comprises a series of conduits, which connect various components in which blow-by gases collect (e.g., the crankcase chamber 67). In particular, in the illustrated arrangement, these components are in communication with the right intake cam chamber 202, which is defined by the intake cam cover 88a of the right cylinder bank 57 (i.e., the higher cylinder bank).

The intake cam chamber 202 includes an outlet, which is connected to the induction system 75 so that the blow-by gases can be burned with an intake charge. The intake cam chamber 202 preferably includes a lubricant separator, which is preferably located at one of the higher points in the engine. The lubricant separator preferably includes one or more baffles, which define a tortuous path for the blow-by-gases as they move from the intake cam chamber 202 to the outlet. This path act to separate lubricant from the blow-by gases such that they can be returned to the lubricant system. Advantageously, the lubricant separator is located in the upper end portion of the intake cam chamber 202 of the cylinder bank 57 opposite where the high pressure fuel pump 179 is located. More preferably, the lubricant separator is located on the right or higher bank 57 while the high pressure pump is located on the left or lower cylinder side 55. This arrangement is preferred because it also results in a more compact engine design.

Figure 6:
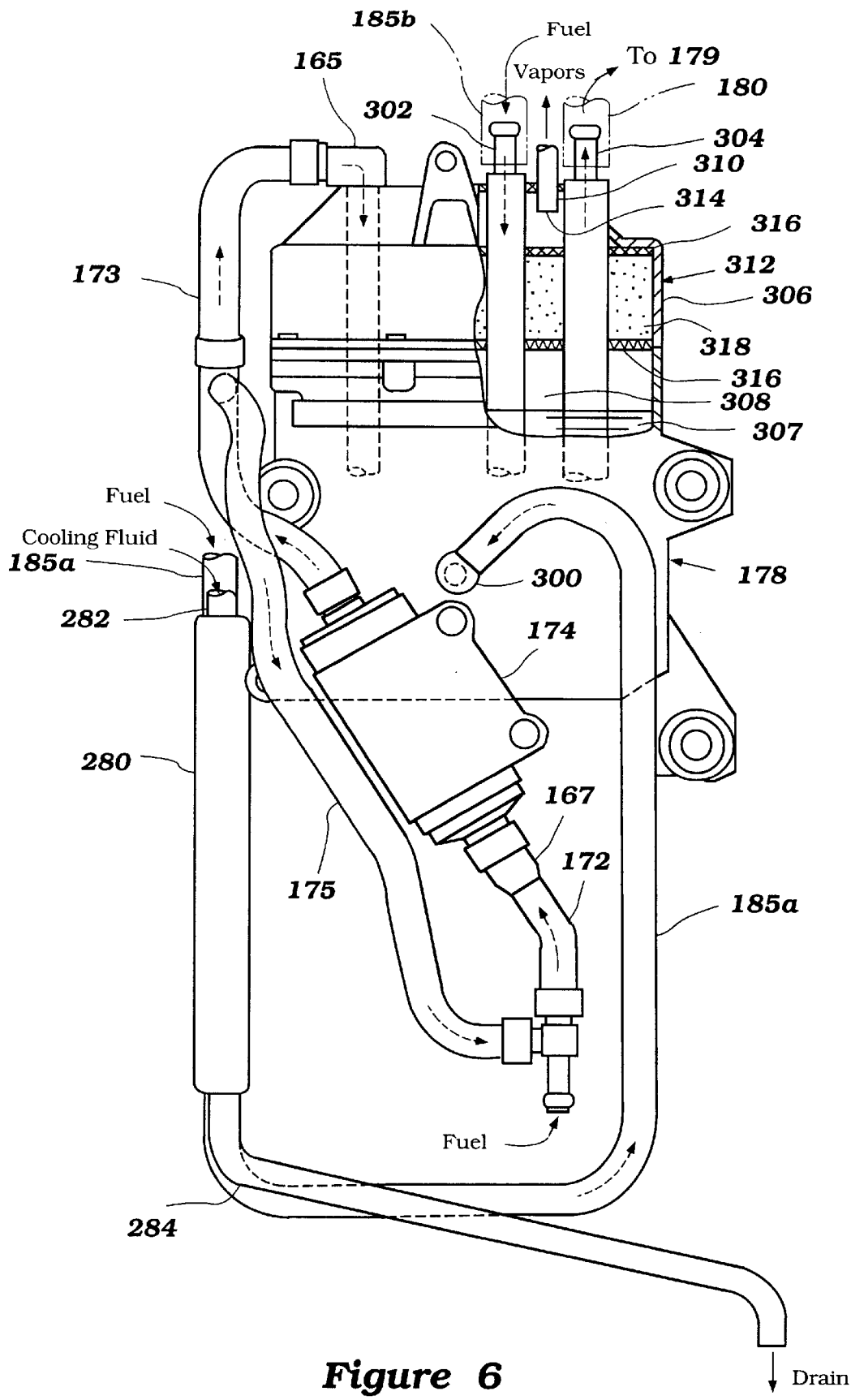
FIG. 6 is a partial cross-sectional view of a vapor separator of the engine of FIG. 1.

With reference now to FIG. 6, the vapor separator 178, which has certain features and advantages according to the present invention, will be described in detail. As mentioned above, fuel is fed into the vapor separator 178 from the fuel pump 174 through a first fuel line 173. Fuel is returned to the vapor separator from the high pressure fuel pump 179 through first and second return lines 185a, 185b, which are connected to first and second inlets 300, 302 of the vapor separator 178. The vapor separator 178 includes an outlet 304, which is connected to the high pressure hose 180.

Although not illustrated, the vapor separator 178 preferably includes a float controlled valve for controlling the level of fuel in the vapor separator 178. The float control valve is connected to the inlet 167. A float is operatively associated with the float controlled valve for to allows fuel into the vapor separator 178, when the fuel reaches a low level. The vapor separator 178 acts to draw off and separate fuel vapors and other vapors from the liquid fuel. Specifically, the housing 306 of the vapor separator 178 defines a cavity 308. The fuel 307 tends to settle in the lower portions of the cavity 308 while the vapors tend to rise to the upper portions of the cavity 308. A vent port 310 is position on an upper end of the housing 306. Vapors collected in the vapor separator 178 can therefore be withdrawn from the vapor separator and transferred to the induction system 72 through the vent port 310.

As mentioned above, because the illustrated engine 22 operates on a four-stroke cycle combustion principle, the temperatures within the cowling can become fairly high as compared to an outboard motor with an engine operating on a two stroke cycle combustion principle. As such, the amount of fuel vapors collected in the vapor separator and returned to the induction system 72 can be quite high. This can adversely affect engine performance. Specifically, the hydrocarbons in the fuel vapors can affect the air/fuel ration resulting in unstable engine conditions and/or the increase of CO2, NOx, and other pollutants. To reduce the amount of fuel vapors, the vapor separator 178 preferably includes a fuel vapor reduction canister 312.

As illustrated in FIG. 6, the fuel vapor canister 312 is preferably positioned in the upper portion of the cavity 308 below an inlet 314 of the vent and above the fuel 307. The canister 312 is preferably defined, at least in part, by the housing 306 of the vapor separator 178 and a pair of mesh plates 316 (i.e., a plate with a plurality of small passages). Fuel absorption media 318, such as, for example, activated carbon, is positioned between the pair of mesh plates 316. The canister 312 is arranged in the vapor separator 178 such that the fuel vapors must pass through the canister 312 before entering the vent 310. As such, the inlets 165, 300, 302 and the outlet 304 all preferably extend to a point in the cavity 308 below the canister 312. Moreover, the canister 312 preferably extends completely across the cavity 308 such that vapors removed from the fuel 307 must pass through the canister 312 to reach the vent 310.

The canister 312 is used to extract hydrocarbon vapors from the vapors collected by the vapor separator 178. The hydrocarbons are collected in the absorption media 318 and returned to the liquid fuel 307. In this manner, the hydrocarbons are not fed into the induction system 72. This improves engine performance and engine stability.

Of course, the foregoing description is that of preferred embodiments of the invention, and various changes and modifications may be made without departing from the spirit and scope of the invention, as defined by the appended claims.

What is claimed is:

1. A four-cycle engine for powering an outboard motor, the engine comprising a plurality of combustion chambers arranged generally vertically above one another, the combustion chambers formed by at least an engine body, a cylinder head assembly and a piston that moves relative to the engine body and the cylinder head assembly, a crankshaft that extends in a generally vertical direction and is coupled to the piston such that movement of the piston causes the crankshaft to rotate, at least one air intake port and at least one exhaust port communicating with the combustion chamber, an intake valve moveable between an open and closed position, an exhaust valve moveable between an open and closed position, a valve actuating mechanism that actuates the exhaust and intake valves, a head cover assembly that covers the valve actuating mechanism, a fuel injection system that comprises at least one fuel injector, a fuel pump that communicates with at least one of the fuel injectors, a vapor separator that communicates with the fuel pump through at least a first supply line, and at least one return line that is arranged to return fuel to the vapor separator from a point downstream of the fuel pump, the vapor separator including a vent and a fuel absorption canister that includes a fuel absorption media, the canister being located in the vapor separator below the vent.

2. The engine of claim 1, wherein the canister comprises a pair of plates that include a plurality of small passages and are mounted within a housing of the vapor separator, the fuel absorption media being disposed between the pair of plates.

3. The engine of claim 1, wherein the fuel absorption media is activated carbon.

4. The engine of claim 1, wherein an outlet of the at least one return supply line lies below the canister and the inlet of first supply line also lies below the canister.

5. The engine of claim 1, wherein the vent is connected to an induction system of the engine.

6. The engine of claim 1, wherein the valve actuating mechanism includes an intake cam shaft and an exhaust camshaft.

7. The engine of claim 6, wherein the fuel pump is actuated, at least partially, by rotation of the intake cam shaft or the exhaust cam shaft.

8. The engine of claim 7, wherein the fuel pump is actuated by the intake cam shaft.

9. The engine of claim 1, wherein the at least one fuel injector is arranged to deliver fuel directly to the combustion chamber.

10. The engine of claim 1, including induction system for supplying an intake air charge to the intake ports, the induction system including an intake manifold with a bent portion, the bent portion defining an outer bent section that generally faces the cover assembly and an inner bent section that generally faces the engine body, a fuel rail connected to the fuel pump and at least one of the fuel injectors and being positioned within a space defined between the outer bent section and the cover assembly.

11. The engine of claim 1, wherein the cylinder block and the cylinder head assembly cooperate to define a first cylinder bank containing at least one cylinder and a second cylinder bank also containing at least one cylinder, the first and second cylinder banks arranged generally in a "V-shape, the first and second cylinder banks being offset vertically from each other such that the first cylinder bank is lower than the second cylinder bank.

12. The engine of claim 11, wherein the fuel pump is actuated by an exhaust cam shaft or an intake cam shaft of the first cylinder bank.

13. The engine of claim 11, further comprising and induction system for supplying an intake air charge to the intake ports, the induction system including an intake manifold with a bent portion, the bent portion defining an outer bent section that generally faces the cover assembly and an inner bent section that generally faces the engine body, the fuel rail being positioned within a space defined between the outer bent section and the cover assembly.

14. The engine of claim 13, wherein a fuel rail is connected to the fuel pump and at least one of the fuel injectors, the fuel rail being positioned within a space defined between the outer bent portion and the intake camshaft cover.

15. A four-cycle engine for powering an outboard motor, the engine comprising a plurality of combustion chambers arranged generally vertically above one another, the combustion chambers formed by at least an engine body, a cylinder head assembly and a piston that moves relative to the engine body and the cylinder head assembly, a crankshaft that extends in a generally vertical direction and is coupled to the piston such that movement of the piston causes the crankshaft to rotate, at least one air intake port and at least one exhaust port communicating with the combustion chamber, an intake valve moveable between an open and closed position, an exhaust valve moveable between an open and closed position, a valve actuating mechanism that actuates the exhaust and intake valves, a head cover assembly that covers the valve actuating mechanism, a fuel injection system that comprises at least one fuel injector, a fuel pump that communicates with at least one of the fuel injectors, a vapor separator that communicates with the fuel pump through at least a first supply line, and at least one return line that is arranged to return fuel to the vapor separator from a point downstream of the fuel pump, the vapor separator including a vent and means for reducing an amount of hydrocarbons entering the vent.

16. The engine of claim 15, wherein the means for reducing an amount of hydrocarbons entering the vent includes a canister positioned within the vapor separator.

17. The engine of claim 16, wherein the canister comprises a pair of plates that include a plurality of small passages and are mounted within a housing of the vapor separator, a fuel absorption media being disposed between the pair of plates.

18. The engine of claim 17, wherein the fuel absorption media is activated carbon.

19. The engine of claim 15, wherein an outlet of the at least one return supply line lies below and the inlet of the first supply line 1e below the means for reducing an amount of hydrocarbons entering the vent.

20. The engine of claim 15, wherein the vent is connected to an induction system of the engine.

21. A vapor separator for an internal combustion engine comprising a housing, which defines a cavity, a first inlet conduit that is connected to a first fuel supply line, a first outlet conduit that is connected to a second fuel supply line, and a second inlet conduit that is connected to a fuel return line, and a vent, the vapor separator arranged such that liquid fuel is collected in a lower portion of the vapor separator and vapors are collected in an upper portion of the vapor separator, the first and the second inlet conduits having outlets located in the lower portion, the first outlet conduit having an inlet also located in the lower portion, the vent having an inlet located in the upper portion, the vapor separator further including a fuel absorption canister that includes a fuel absorption media, the canister being located in the vapor separator below the inlet of the vent and above the outlets of the first and second inlet conduits and the inlet of the first outlet conduit.

22. The vapor separator of claim 21, wherein the canister comprises a pair of plates that include a plurality of small passages and are mounted within the housing of the vapor separator, the fuel absorption media being disposed between the pair of plates.

23. The vapor separator of claim 21, wherein the fuel absorption media is activated carbon.

24. The vapor separator of claim 21, wherein the vent is connected to an induction system of the engine.

25. A vapor separator for an internal combustion engine comprising a housing, which defines a cavity, a first inlet conduit that is connected to a first fuel supply line, a first outlet conduit that is connected to a second fuel supply line, and a second inlet conduit that is connected to a fuel return line, and a vent, the vapor separator arranged such that liquid fuel is collected in a lower portion of the vapor separator and vapors are collected in an upper portion of the vapor separator, the first and the second inlet conduits having outlets located in the lower portion, the first outlet conduit having an inlet also located in the lower portion, the vent having an inlet located in the upper portion, the vapor separator further including means for reducing an amount of hydrocarbons from entering the inlet of the vent.

26. The vapor separator of claim 25, wherein the means includes a fuel absorption canister that includes a fuel absorption media, the canister being located in the vapor separator below the inlet of the vent and above the outlets of the first and second inlet conduits and the inlet of the first outlet conduit.

27. The vapor separator of claim 26, wherein the canister comprises a pair of plates that include a plurality of small passages and are mounted within the housing of the vapor separator, the fuel absorption media being disposed between the pair of plates.

28. The vapor separator of claim 26, wherein the fuel absorption media is activated carbon.

29. The vapor separator of claim 25, wherein the vent is connected to an induction system of the engine.

* * * * *